United States Patent
Murphy

(10) Patent No.: US 9,759,636 B2
(45) Date of Patent: Sep. 12, 2017

(54) SYNCHRONIZED MEASUREMENTS FOR A PORTABLE MULTI-CHANNEL WIRELESS SENSOR SYSTEM

(71) Applicant: Jonathan Murphy, Friday Harbor, WA (US)

(72) Inventor: Jonathan Murphy, Friday Harbor, WA (US)

(73) Assignee: AKTIEBOLAGET SKF, Gothenburg (SE)

( * ) Notice: Subject to any disclaimer, the term of this patent is extended or adjusted under 35 U.S.C. 154(b) by 132 days.

(21) Appl. No.: 14/670,732

(22) Filed: Mar. 27, 2015

(65) Prior Publication Data
US 2016/0282232 A1    Sep. 29, 2016

(51) Int. Cl.
*H04L 7/00* (2006.01)
*G01H 1/00* (2006.01)
*G01M 99/00* (2011.01)
*H04W 4/00* (2009.01)
*H04W 56/00* (2009.01)

(52) U.S. Cl.
CPC ......... *G01M 99/005* (2013.01); *H04W 4/005* (2013.01); *H04W 56/0015* (2013.01); *H04L 7/0012* (2013.01)

(58) Field of Classification Search
CPC .......... B23Q 17/12; G01H 1/003; G01H 1/00; G01H 17/00; G01M 13/028; G01M 13/045; G06F 1/12; G06F 1/14; H04L 7/0012
See application file for complete search history.

(56) References Cited

U.S. PATENT DOCUMENTS

| | | | | |
|---|---|---|---|---|
| 4,882,770 A * | 11/1989 | Miyahira | ........... | H04B 10/1149 398/103 |
| 5,943,634 A * | 8/1999 | Piety | ...................... | B23Q 17/12 700/280 |
| 5,945,603 A * | 8/1999 | Shih | ........................ | G01H 1/00 73/40.5 A |
| 5,965,819 A * | 10/1999 | Piety | ...................... | G01N 29/44 702/56 |
| 6,078,874 A * | 6/2000 | Piety | ...................... | G01H 1/003 702/122 |
| 6,079,275 A * | 6/2000 | Komninos | ............... | G01H 1/00 73/661 |

(Continued)

FOREIGN PATENT DOCUMENTS

JP    2009-77344 A    *    4/2009

OTHER PUBLICATIONS

Author Unknown, GTI Predictive Technology, web-page: https://www.gtipredictive.com/, accessed Mar. 27, 2015, pp. 1-2.

*Primary Examiner* — David A Rogers
(74) *Attorney, Agent, or Firm* — Bryan Peckjian; SKF USA Inc. Patent Dept.

(57) ABSTRACT

A system for monitoring a machine includes first and second mobile units. The first mobile unit includes an emitter, a clock in communication with the emitter, and a sensor in communication with the clock. The second mobile unit includes a detector, a clock in communication with the detector, and a sensor in communication with the clock. The detector of the second mobile unit is configured to detect a signal from the emitter of the first mobile unit, and the clocks in the first and second mobile units are configured to be synchronized in response to the detection of the signal.

18 Claims, 4 Drawing Sheets

(56) References Cited

U.S. PATENT DOCUMENTS

| | | | | |
|---|---|---|---|---|
| 6,208,944 | B1* | 3/2001 | Franke | G01H 1/003 340/680 |
| 6,301,514 | B1* | 10/2001 | Canada | G01H 1/003 340/3.1 |
| 6,347,163 | B2* | 2/2002 | Roustaei | 235/462.21 |
| 6,489,884 | B1* | 12/2002 | Lamberson | G01H 1/003 340/3.1 |
| 6,513,386 | B2* | 2/2003 | Barclay | G01M 13/045 73/649 |
| 6,672,168 | B2* | 1/2004 | Higgins | G01H 11/08 73/660 |
| 6,683,970 | B1* | 1/2004 | Satake | G01N 21/31 348/89 |
| 6,760,677 | B2* | 7/2004 | Tanizume | H04L 12/66 702/89 |
| 7,254,504 | B2* | 8/2007 | Klotz | G01S 13/931 702/85 |
| 7,908,928 | B2* | 3/2011 | Vik | G01M 5/0033 73/806 |
| 8,583,792 | B2* | 11/2013 | Narasimhan | H04L 41/046 709/223 |
| 8,590,384 | B2* | 11/2013 | Lotscher | G01H 11/08 73/592 |
| 8,622,901 | B2* | 1/2014 | Jain | A61B 5/0022 600/300 |
| 8,800,374 | B2* | 8/2014 | Sonyey | G01H 17/00 361/679.01 |
| 2002/0000126 | A1* | 1/2002 | Barclay | G01M 13/028 73/649 |
| 2006/0236771 | A1* | 10/2006 | Lin | G01H 1/00 73/649 |
| 2007/0256500 | A1* | 11/2007 | Vornbrock | G01N 29/24 73/649 |
| 2008/0105056 | A1* | 5/2008 | Popescu | G01H 3/00 73/649 |
| 2009/0110405 | A1* | 4/2009 | Lee | H04B 10/116 398/130 |
| 2011/0279952 | A1* | 11/2011 | Sonyey | G01H 17/00 361/679.01 |
| 2012/0263165 | A1* | 10/2012 | Zakrzewski | H04W 56/009 370/350 |
| 2014/0092918 | A1* | 4/2014 | Jost | H04J 3/0661 370/465 |
| 2014/0301513 | A1* | 10/2014 | Takahashi | G06F 1/12 375/354 |
| 2015/0024508 | A1* | 1/2015 | Horkheimer | G01N 27/414 436/163 |
| 2015/0065881 | A1* | 3/2015 | Cho | A61B 8/54 600/443 |
| 2015/0078140 | A1* | 3/2015 | Riobo Aboy | A61B 5/1101 368/11 |
| 2015/0217728 | A1* | 8/2015 | Iwai | B60R 25/305 701/1 |
| 2015/0250445 | A1* | 9/2015 | Spiegel | A61B 7/008 600/301 |
| 2015/0268072 | A1* | 9/2015 | Fujiwara | G01D 21/02 702/183 |
| 2015/0283427 | A1* | 10/2015 | Shibuya | G09B 19/0038 700/91 |
| 2015/0285932 | A1* | 10/2015 | Nyffenegger | G01V 1/186 702/190 |
| 2015/0338510 | A1* | 11/2015 | Pandharipande | H05B 33/0815 367/93 |
| 2015/0350752 | A1* | 12/2015 | Solomon | H04Q 9/04 340/870.01 |
| 2015/0355045 | A1* | 12/2015 | Solomon | F17D 5/02 702/36 |

* cited by examiner

SYNCHRONIZED MEASUREMENTS FOR A PORTABLE MULTI-CHANNEL WIRELESS SENSOR SYSTEM

BACKGROUND

The measurement of vibration is the most common method of assessing the mechanical status of machinery for condition monitoring purposes. To measure vibration, one or more vibration sensors are coupled to a machine at various locations. The sensors collect vibration data and transmit the vibration data to a remote device for analysis. The sensors may transmit the vibration data through wires. In other embodiments, the sensors may transmit the vibration data wirelessly.

When the sensors transmit the vibration data wirelessly, the sensors may be synchronized together over a radiofrequency ("RF") network with the remote device. This may enable the sensors to be synchronized to within about 1 millisecond to about 1 second. While this level of synchronization may be satisfactory for some purposes, a more precise level of synchronization between wireless vibration sensors is needed.

SUMMARY

A system for monitoring a machine is disclosed. The system includes first and second mobile units. The first mobile unit includes an emitter, a clock in communication with the emitter, and a sensor in communication with the clock. The second mobile unit includes a detector, a clock in communication with the detector, and a sensor in communication with the clock. The detector of the second mobile unit is configured to detect a signal from the emitter of the first mobile unit, and the clocks in the first and second mobile units are configured to be synchronized in response to the detection of the signal.

A method for monitoring a machine is also disclosed. The method includes positioning first and second mobile units such that an emitter of the first mobile unit is in range to communicate with a detector of the second mobile unit. A signal is emitted from the emitter of the first mobile unit that is detected by the detector of the second mobile unit. A clock in the first mobile unit is synchronized with a clock in the second mobile unit using the signal emitted from the emitter of the first mobile unit.

In another embodiment, the method may include connecting a remote device to first and second mobile units. A clock in the first mobile unit is synchronized with a clock in the second mobile unit to a first level of accuracy using a signal from the remote device. The first and second mobile units are positioned such that an emitter of the first mobile unit is in range to communicate with a detector of the second mobile unit. A signal is emitted from the emitter of the first mobile unit that is detected by the detector of the second mobile unit. The clock in the first mobile unit is synchronized with the clock in the second mobile unit to a second level of accuracy using the signal emitted from the emitter of the first mobile unit, wherein the second level of accuracy is greater than the first level of accuracy.

BRIEF DESCRIPTION OF THE DRAWINGS

The accompanying drawings, which are incorporated in and constitutes a part of this specification, illustrates an embodiment of the present teachings and together with the description, serves to explain the principles of the present teachings. In the figures.

Figure 1:
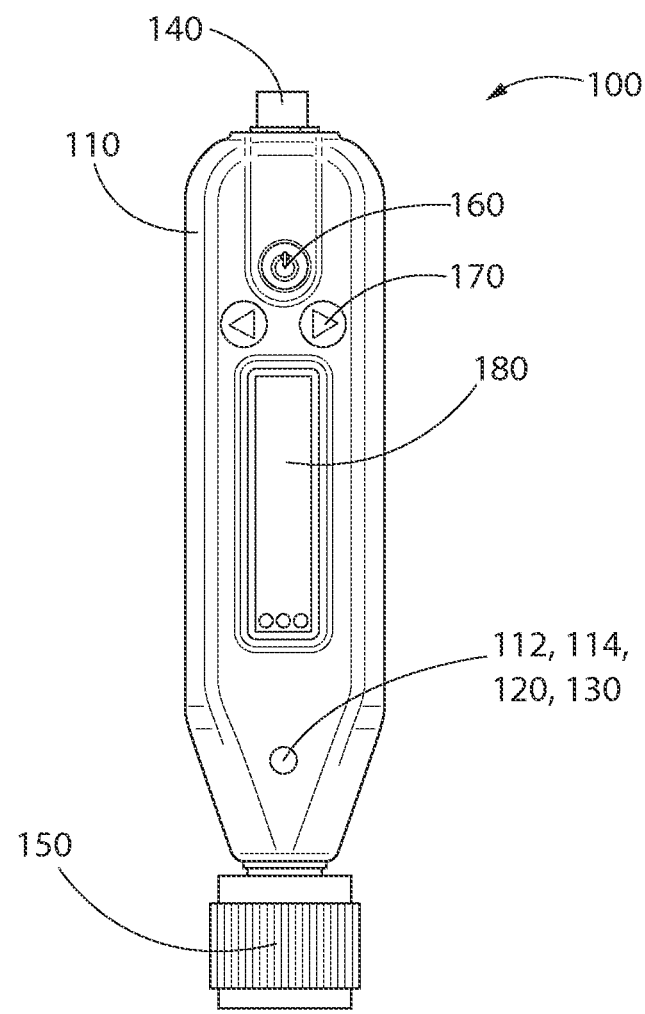
FIG. 1 illustrates a front view of a mobile unit, according to an embodiment.

It should be noted that some details of the figures have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements, where convenient. In the following description, reference is made to the accompanying drawings that form a part of the description, and in which is shown by way of illustration one or more specific example embodiments in which the present teachings may be practiced.

Further, notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

FIG. 1 illustrates a front view of a mobile unit 100, according to an embodiment. The mobile unit 100 includes a body 110. An emitter 120 may be positioned within the body 110. The emitter 120 may be configured to transmit a signal to another mobile unit. In one example, the emitter 120 may be a light emitter that includes a light emitting diode ("LED"), an infrared ("IR") light source, or the like that is configured to emit a pulse of light through an opening 112 in the body 110. The pulse of light may have a duration from about 10 nanoseconds to about 1 second. The time between two or more pulses may also be from about 10 nanoseconds to about 1 second. The edge of a pulse may be used for synchronization to an absolute time while the duration of a pulse and/or the time between pulses may be used to calibrate the clock of the mobile unit being synchronized. In at least one embodiment, the duration of the pulses and/or the time between the pulses may become less and less as the calibration reaches finer and finer precision.

A detector 130 may also be positioned within the body 110. The detector 130 may be configured to receive the signal from the emitter of another mobile unit. In one example, the detector 130 may be a light detector that includes a photodiode or the like that is configured to sense or detect the pulse of light through the opening 112. When operating through the same opening 112, the emitter 120 and the detector 130 may not operate simultaneously. Although shown as operating through the same opening 112 in FIG. 1, as will be appreciated, in other embodiments, the emitter 120 may transmit the (e.g., light) signal through a first opening in the body 110, and the detector 130 may sense or detect the (e.g., light) signal through a second, different opening in the body 110. In another example, the signal may include an electrical signal conducted through a cable.

In at least one embodiment, a window or filter 114 may be positioned over the opening 112 (i.e., positioned over the emitter 120, the detector 130, or both). The window or filter 114 may be configured to allow light within a predetermined frequency band or wavelength band to pass therethrough while preventing (i.e., filtering) light outside the band(s) from passing therethrough. The emitter 120 may be tuned to transmit light that is within this frequency band or wavelength band. Similarly, the detector 130 may be tuned to detect light that is within this frequency band or wavelength band.

In another example, the emitter 120 may be a sound emitter that is configured to emit a pulse of sound (e.g., a mechanical vibration or chirp), and the detector 130 may be a sound detector that is configured to sense or detect the pulse of sound. The pulse of sound may have the same duration as the pulse of light described above. In yet another example, the emitter 120 may be a RF emitter that is configured to emit a RF pulse, and the detector 130 may be a RF detector that is configured to sense or detect the RF pulse.

The mobile unit 100 may include a connector 140 for connecting to another component. In one example, a charging cable may be connected to the connector 140 to charge a power source (e.g., a battery) inside the body 110. In another example, a data cable may be connected to the connector 140 to transmit data to and/or from a memory in the body 110. In yet another embodiment, the connector 140 may be used to connect a sensor (e.g., a tachometer) to the body 110.

Figure 2:
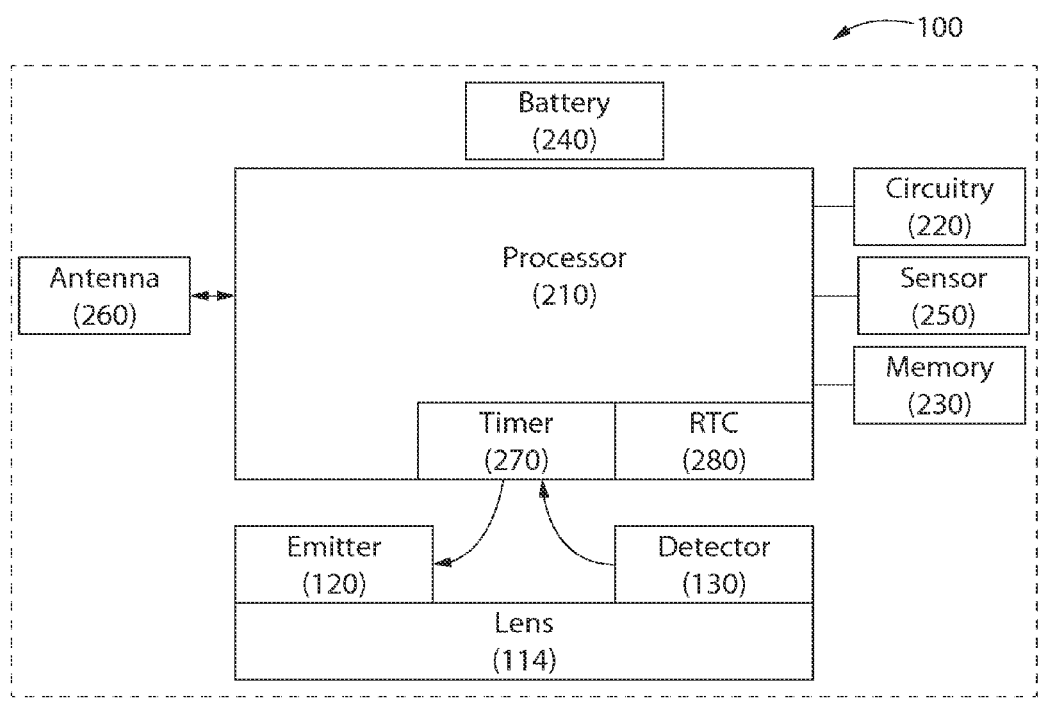
FIG. 2 illustrates a schematic view of the mobile unit shown in FIG. 1, according to an embodiment.

The mobile unit 100 may also include a sensory apparatus or "head" 150 that may be releasably coupled, e.g., mechanically and electrically, with the mobile unit 100 so as to be positionally fixed thereto, receive power therefrom, and provide one or more signals thereto. The sensory head 150 may include, for example, at least one sensor positioned therein, as shown in FIG. 2. In at least one embodiment, the opening 112, the emitter 120, and/or the detector 130 may be positioned on the sensory head 150.

In at least one embodiment, the mobile unit 100 may include a power button 160, one or more control buttons 170, and a display screen 180, which may be configured to display data based on the measurements taken using the sensory head 150. In other embodiments, the display screen 180 may be omitted from the mobile unit 100, or may otherwise not display such data.

FIG. 2 illustrates a schematic view of the mobile unit 100 shown in FIG. 1, according to an embodiment. The mobile unit 100 may include one or more logic devices 210 such as a microprocessor and/or other logic devices, circuitry 220 such as a printed circuit board (PCB) or flexible printed circuit (flex circuit), one or more memory devices 230, and one or more power sources 240 such as one or more batteries or supercapacitors. The power source 240 may provide power to the logic device 210, the circuitry 220, and the memory device 230 to enable their operation in the absence of power from another source.

The mobile unit 100 may also include the sensor 250, which may be positioned within the body 110 or the sensory head 140 (see FIG. 1). The sensor 250 may be configured to sense or measure one or more parameters when the mobile unit 100 is coupled to a machine. For example, the sensor 250 may sense or measure vibration, pressure, temperature, position, (linear or rotational) velocity, acceleration, enveloped acceleration (for detection of bearing or other impact type defects), machine rotational speed, torque, and the like.

The mobile unit 100 may also include an antenna 260 that is configured to transmit and/or receive signals from a remote device. As discussed in more detail below, the signals may include timing/synchronization data, or the signals may include data measured by the sensor 250. In at least one embodiment, the signals may be RF signals.

The mobile unit 100 may also include a timer 270 and a real time clock ("RTC") 280. The real time clock 280 may keep the date and time. The timer 270 may be used to fine-tune the real time clock 280 during synchronization, as discussed in more detail below. As shown, the emitter 120 and the detector 130 may be in communication with the timer 270.

Figure 3:
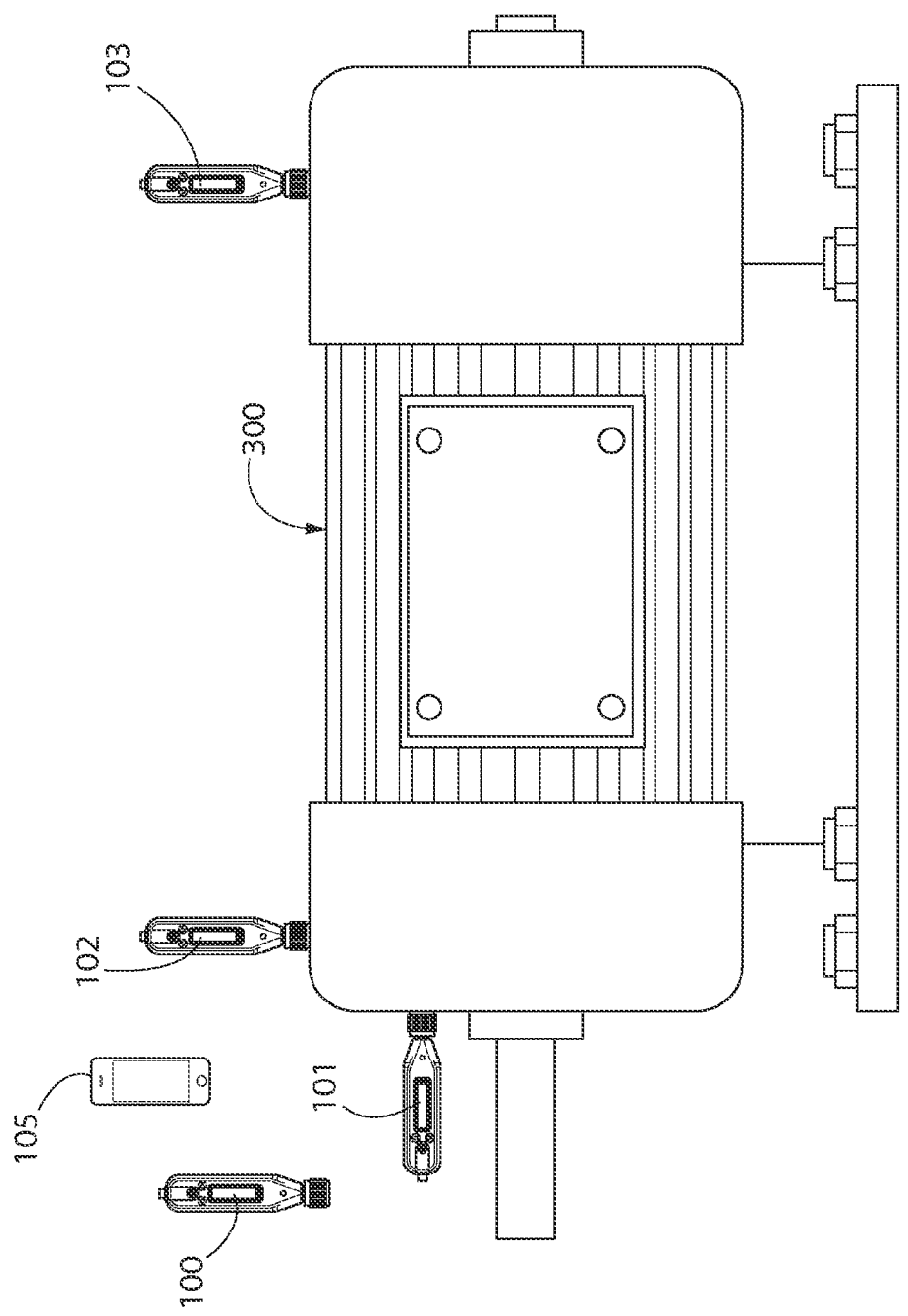
FIG. 3 illustrates a front view of a machine having a plurality of mobile units coupled thereto, according to an embodiment.

FIG. 3 illustrates a front view of a machine 300 having a plurality of mobile units (four are shown: 100-103) coupled thereto, according to an embodiment. The machine 300 may be or include one or more moving components that generate vibration. For example, the machine 300 may be a turbine, a compressor, a motor, or the like.

As shown, the mobile units 100-103 may be coupled to the machine 300 at various locations around the machine 300. The sensory heads 150 (see FIG. 1) may be used to couple the mobile units 100-103 to the machine 300. In one example, the sensory heads 150 may be magnetic, which may be drawn to a metal body of the machine 300. In another embodiment, the sensory heads 150 may be coupled to the machine 300 mechanically (e.g., via threads), using an adhesive, or the like.

A remote device 105 may be in (e.g., wireless) communication with the mobile devices 100-103. The remote device 105 may be a portable electronic device, such as a smartphone, tablet, or laptop computer, or may be another type of specific or general-purpose computing device that is supplied with appropriate software. The remote device 105 may be in wireless communication with the mobile units 100-103, and, in some embodiments, vice versa, via any suitable communications link, such as a wireless link (e.g., BLUETOOTH®, WiFi, WIMAX®, GSM, CDMA, LTE, etc.).

Figure 4:
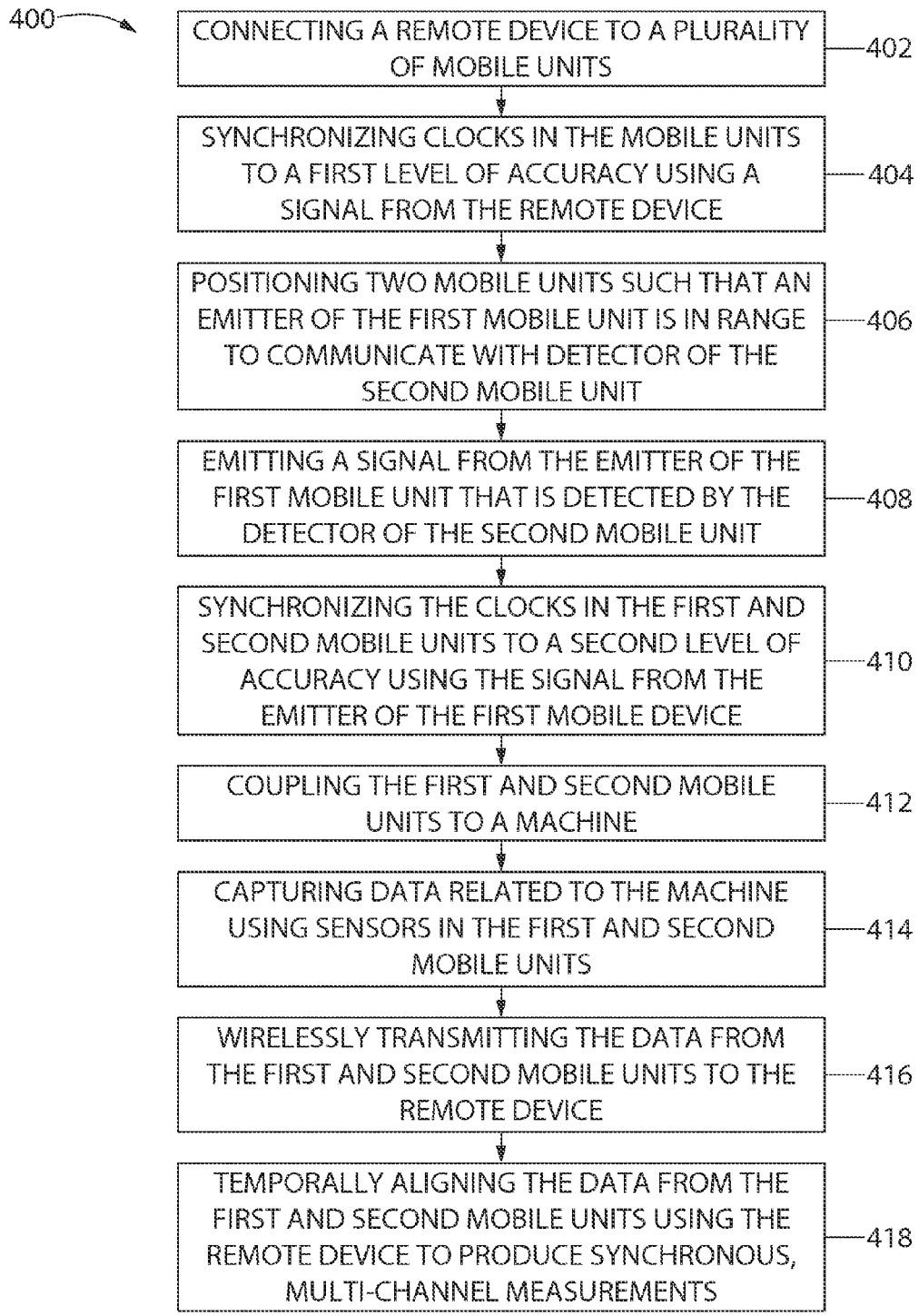
FIG. 4 illustrates a flow chart of a method for synchronizing a plurality of mobile units, according to an embodiment.

FIG. 4 illustrates a flow chart of a method 400 for synchronizing a plurality of mobile units 100-103, according to an embodiment. The method 400 may begin by wirelessly connecting a remote device 105 to one or more mobile units 100-103, as at 402. More particularly, the remote device 105 may wirelessly connect with the mobile units 100-103 by transmitting RF signals to (and/or receiving RF signals from) the antennas 260 of the mobile units 100-103.

Once connected, the remote device 105 may cause the real time clocks 280 of the mobile units 100-103 to be synchronized to a first level of accuracy using a signal from the remote device 105, as at 404. More particularly, the remote device 105 may transmit a RF signal to the antennas 260 of the mobile units 100-103 that causes the real time clock 280 in each mobile unit (e.g., mobile unit 100) to be synchronized with the clock of the remote device 105 (and with the real time clocks 280 of the other mobile units 101-103). The first level of accuracy may be from about 1 millisecond to about 1 second.

A first one of the mobile units (e.g., mobile unit 100) may then be positioned such that its emitter 120 is in range to communicate with (e.g., faces) the detector 130 of a second one of the mobile units (e.g., mobile unit 101), as at 406. A distance between the emitter 120 of the first mobile unit 100 and the detector 130 of the second mobile unit 101 may be from about 0.1 cm to about 10 cm or more.

The emitter 120 of the first mobile unit 100 may then emit a signal, which may be detected by the detector 130 of the second mobile unit 101, as at 408. For example, the remote device 105 may transmit a RF signal to the first mobile unit 100 causing the first mobile unit 100 to emit the signal. In another example, the user may manually cause the first mobile unit 100 to emit the signal (e.g., by pressing the buttons 170). As discussed above, the signal may be a pulse of light, a sound, a RF signal, or the like.

The real time clocks 280 of the mobile units 100, 101 may then be synchronized to a second level of accuracy using the signal from the emitter 120 of the first mobile unit 100, as at 410. More particularly, the timer 270 of the first mobile unit 100 may be at time $T_0$ when the emitter 120 of the first mobile unit 100 emits the signal. The timer 270 of the first mobile unit 100 may notify the real time clock 280 of the first mobile unit 100 that the signal was emitted at time $T_0$.

The timer 270 of the second mobile unit 101 may be at time $T_1$ when the detector 120 of the second mobile unit 101 detects the signal. The timer 270 of the second mobile unit 101 may notify the real time clock of the second mobile unit 101 that the signal was emitted at time $T_1$. Thus, the timers 270 may be used to synchronize the real time clocks 280 to greater levels of accuracy/precision (e.g., to within $T_1-T_0$) than may be achieved through the RF signals described in step 404. The difference between $T_0$ and $T_1$ may be from about 1 nanosecond to about 1 millisecond. For example, the difference may be from about 1 nanosecond to about 10 nanoseconds, about 10 nanoseconds to about 100 nanoseconds, about 100 nanoseconds to about 1 microsecond, about 1 microsecond to about 10 microseconds, about 10 microseconds to about 100 microseconds, or about 100 microseconds to about 1 millisecond. The synchronization process may be iterative, with each successive iteration achieving a greater level of accuracy (e.g., a smaller difference). Once the second mobile unit 101 is synchronized to the first mobile unit 100, the process may be repeated for one or more mobile units (e.g., mobile units 102, 103).

Once the mobile units 100-103 have been synchronized, as described in step 410 above, the mobile units 100-103 may be coupled to the machine 300, as at 412. The mobile units 100-103 may then capture or record data, as at 414. For example, the remote device 105 may transmit RF signals to the mobile units 100-103 causing the mobile units 100-103 to begin capturing data. In another example, the user may manually cause the mobile units 100-103 to begin capturing data (e.g., by pressing the buttons 170). In at least one embodiment, one of the mobile units (e.g., mobile unit 100) may be coupled to a tachometer via the connector 140. The tachometer may measure the speed of rotation of one or more components (e.g., a shaft) inside the machine 300.

The mobile units 100-103 may be single-channel sensors or multi-channel sensors. In one embodiment, the mobile units 100-103 may each be or include a single-channel sensor, and together the mobile units 100-103 may be configured to capture four different channels of synchronous data. For example, the first mobile unit 100 (i.e., the first channel) may be configured to capture shaft rotational speed data, the second mobile unit 101 (i.e., the second channel) may be configured to capture axial acceleration data, the third mobile unit 102 (i.e., the third channel) may be configured to capture inboard acceleration data, and the fourth mobile unit 103 (i.e., the fourth channel) may be configured to capture outboard acceleration data. The data in the different channels may be used to support different analyses such as an operational deflection shape analysis.

Once the data has been captured, the mobile units 100-103 may (e.g., wirelessly) transmit the data to the remote device 105, as at 416. The data may be transmitted to the remote device 105 while the mobile units 100-103 are coupled to the machine 300 or after the mobile units 100-103 have been decoupled from the machine 300. In at least one embodiment, the mobile units 100-103 may wirelessly transmit the data to the remote device 105 substantially in real-time as the data is being captured. Once the data is received by the remote device 105, the data from the different mobile units 100-103 (e.g., channels) may be temporally aligned using time stamps on the data to produce synchronous multi-channel measurements, as at 418. In another embodiment, step 418 may be uploaded to a server and performed in the cloud.

As the mobile units 100-103 are wireless in some embodiments, the mobile units 100-103 may be coupled to a machine that moves (e.g., a crane). In at least one embodiment, when the emitter 120 produces light for synchronization purposes, the emitter 120 may also be used as a flashlight and/or strobe light for machinery analysis. For example, the light may be used to visually "freeze" machinery rotation to determine the speed of the rotation.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment. Finally, "exemplary" indicates the description is used as an example, rather than implying that it is an ideal.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A system for monitoring a machine, comprising:
a first mobile unit comprising a head configured to be mechanically or magnetically coupled to the machine during monitoring of the machine by the first mobile unit, the first mobile unit further comprising:
a light emitter configured to output a light signal;
an antenna;
a clock in communication with the light emitter; and
a sensor in communication with the clock, wherein the sensor is configured to measure data related to the machine; and
a second mobile unit comprising a head configured to be mechanically or magnetically coupled to the machine during monitoring of the machine by the second mobile unit, the second mobile unit further comprising:
a light detector configured to detect the light signal;
an antenna;
a clock in communication with the light detector; and
a sensor in communication with the clock, wherein the sensor is configured to measure data related to the machine,
wherein:
the first mobile unit is configured to receive a wireless radiofrequency (RF) signal through the antenna of the first mobile unit that synchronizes the clock of the first mobile unit to a first level of accuracy;
the second mobile unit is configured to receive the wireless RF signal through the antenna of the second mobile unit that synchronizes the clock of the second mobile unit to the first level of accuracy; and
the clock of the second mobile unit is configured to by synchronized with the clock of the first mobile unit to a second level of accuracy using the light signal, wherein the second level of accuracy is greater than the first level of accuracy.

2. The system of claim 1, wherein the light emitter comprises a light emitting diode or an infrared light source, and wherein the light detector comprises a photodiode.

3. The system of claim 1, wherein at least one of the first and second mobile units also comprises a filter that covers at least one of the light emitter or the light detector, wherein the filter allows light within a predetermined frequency band or wavelength band to pass therethrough and prevents light outside the predetermined frequency band or wavelength band from passing therethrough.

4. The system of claim 1, wherein the data comprises vibration data, pressure data, temperature data, position data, velocity data, rotational speed, enveloped acceleration, or acceleration data.

5. The system of claim 1, further comprising a remote device configured to output the wireless RF signal to the first mobile unit and the second mobile unit.

6. A method for monitoring a machine, comprising:
positioning first and second mobile units such that a light emitter of the first mobile unit is in range to communicate with a light detector of the second mobile unit;
receiving a wireless radiofrequency (RF) signal through an antenna of the first mobile unit, wherein the wireless RF signal synchronizes a clock of the first mobile unit to a first level of accuracy;
receiving the wireless RF signal through an antenna of the second mobile unit, wherein the wireless RF signal synchronizes a clock of the second mobile unit to the first level of accuracy;
emitting a light signal from the light emitter of the first mobile unit;
detecting the light signal using the light detector of the second mobile unit; and
synchronizing the clock in the first mobile unit with the clock in the second mobile unit to a second level of accuracy using the signal emitted from the light emitter of the first mobile unit, wherein the second level of accuracy is greater than the first level of accuracy.

7. The method of claim 6, wherein:
the light emitter comprises a light emitting diode or an infrared light source; and
the light detector comprises a photodiode.

8. The method of claim 6, further comprising mechanically or magnetically coupling the first and second mobile units to a machine after the synchronizing of the clock of the first mobile unit and the clock of the second mobile unit to the second level of accuracy.

9. The method of claim 8, wherein the first and second mobile units each comprise a sensor, and the method further comprises:
mechanically or magnetically coupling a head of the first mobile unit to the machine;
mechanically or magnetically coupling a head of the second mobile unit to the machine; and
capturing data related to the machine using the sensors in the first and second mobile units after the mechanically or magnetically coupling of the first and second mobile units to the machine.

10. The method of claim 9, wherein the data comprises vibration data, pressure data, temperature data, position data, velocity data, rotational speed, enveloped acceleration, acceleration data, or a combination thereof.

11. The method of claim 9, further comprising:
transmitting the wireless RF signal to the antenna of the first mobile unit and to the antenna of the second mobile unit from a remote device; and
wirelessly transmitting the data from the first and second mobile units to the remote device.

12. The method of claim 11, further comprising temporally aligning the data from the first mobile unit with the data from the second mobile unit using the remote device.

13. A method for monitoring a machine, comprising:
transmitting a wireless radiofrequency (RF) signal from a remote device to an antenna of a first mobile unit and an antenna of a second mobile unit;
synchronizing a clock in the first mobile unit and a clock in the second mobile unit to a first level of accuracy using the wireless RF signal transmitted from the remote device;
positioning the first and second mobile units such that a light emitter of the first mobile unit is in range to communicate with a light detector of the second mobile unit;
causing a light signal to be emitted from the light emitter of the first mobile unit;
detecting the light signal using the light detector of the second mobile unit; and
synchronizing the clock in the first mobile unit with the clock in the second mobile unit to a second level of accuracy using the light signal emitted from the light emitter of the first mobile unit, wherein the second level of accuracy is greater than the first level of accuracy.

14. The method of claim 13, wherein:
the light signal from the light emitter comprises a pulse of light emitted by a light emitting diode or an infrared light source; and;
the light detector comprises a photodiode.

15. The method of claim 14, further comprising coupling the first and second mobile units to a machine after the synchronizing of the clock in the first mobile unit with the clock in the second mobile unit.

16. The method of claim 15, wherein the first and second mobile units each comprise a sensor, and the method further comprises:
mechanically or magnetically coupling a head of the first mobile unit to the machine;
mechanically or magnetically coupling a head of the second mobile unit to the machine; and
capturing vibration data related to the machine using the sensors in the first and second mobile units after the magnetically or magnetically coupling of the first and second mobile units to the machine.

17. The method of claim 16, further comprising wirelessly transmitting the vibration data from the first and second mobile units to the remote device.

18. The method of claim 17, further comprising temporally aligning the vibration data from the first mobile unit with the vibration data from the second mobile unit using the remote device.

* * * * *